(12) United States Patent
Song et al.

(10) Patent No.: US 12,449,375 B2
(45) Date of Patent: Oct. 21, 2025

(54) INSPECTION METHOD, SUBSTRATE PROCESSING METHOD INCLUDING THE SAME, AND SUBSTRATE PROCESSING DEVICE USING THE SUBSTRATE PROCESSING METHOD

(71) Applicant: SAMSUNG ELECTRONICS CO., LTD., Suwon-si (KR)

(72) Inventors: Myunggeun Song, Suwon-si (KR); Sarah Kim, Suwon-si (KR); Changyul Kim, Suwon-si (KR); Younghoon Kim, Suwon-si (KR); Jaeyong Park, Suwon-si (KR); Sungil Cho, Suwon-si (KR); Taeil Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 228 days.

(21) Appl. No.: 18/220,985

(22) Filed: Jul. 12, 2023

(65) Prior Publication Data
US 2024/0201103 A1     Jun. 20, 2024

(30) Foreign Application Priority Data
Aug. 29, 2022   (KR) .................. 10-2022-0108716

(51) Int. Cl.
*G01N 21/94*     (2006.01)
(52) U.S. Cl.
CPC ..... *G01N 21/94* (2013.01); *G01N 2201/1248* (2013.01)
(58) Field of Classification Search
CPC . G01N 21/94; G01N 2201/1248; G01J 3/443; G01J 3/0275; G01J 2003/4435; H01L 21/67253
See application file for complete search history.

(56) References Cited

U.S. PATENT DOCUMENTS

| 5,236,975 | A |   | 8/1993 | Sekine |   |
| 5,912,987 | A | * | 6/1999 | Hashiya | G01J 3/50 382/162 |
| 7,856,463 | B2 | * | 12/2010 | Yamaguchi | G01R 31/31709 708/300 |

(Continued)

FOREIGN PATENT DOCUMENTS

| KR | 10-0643393 B1 | 11/2006 |
| KR | 10-1593305 B1 | 2/2016 |

OTHER PUBLICATIONS

"Development of Multi-Sensor/Big-data Integrated Diagnostics Solution on Semiconductor Manufacturing Equipments", ICT R&D, Jun. 8, 2018, 115 pages.

*Primary Examiner* — Kara E. Geisel
*Assistant Examiner* — Roberto Fabian, Jr.
(74) *Attorney, Agent, or Firm* — Sughrue Mion, PLLC

(57) ABSTRACT

An inspection method includes extracting a first similarity by comparing first data of a first optical signal with reference data of a reference optical signal, generating a first normal distribution of the first similarity, extracting a second similarity by comparing second data of a second optical signal with the reference data of the reference optical signal, generating a second normal distribution of the second similarity, and comparing the first normal distribution with the second normal distribution. The extracting of the first similarity includes deriving the first data of the first optical signal.

20 Claims, 14 Drawing Sheets

(56) References Cited

U.S. PATENT DOCUMENTS

| | | |
|---|---|---|
| 11,039,527 B2 | 6/2021 | Meng et al. |
| 2005/0037500 A1 | 2/2005 | Ciovacco et al. |
| 2015/0235816 A1 | 8/2015 | Yun et al. |
| 2016/0379896 A1* | 12/2016 | Asakura ............ H01J 37/32972 156/345.24 |
| 2017/0287791 A1 | 10/2017 | Coppa et al. |
| 2018/0088031 A1 | 3/2018 | Yang et al. |
| 2021/0125814 A1 | 4/2021 | Sato et al. |
| 2021/0166120 A1 | 6/2021 | Tsutsui |
| 2022/0065735 A1 | 3/2022 | Hilkene |

* cited by examiner

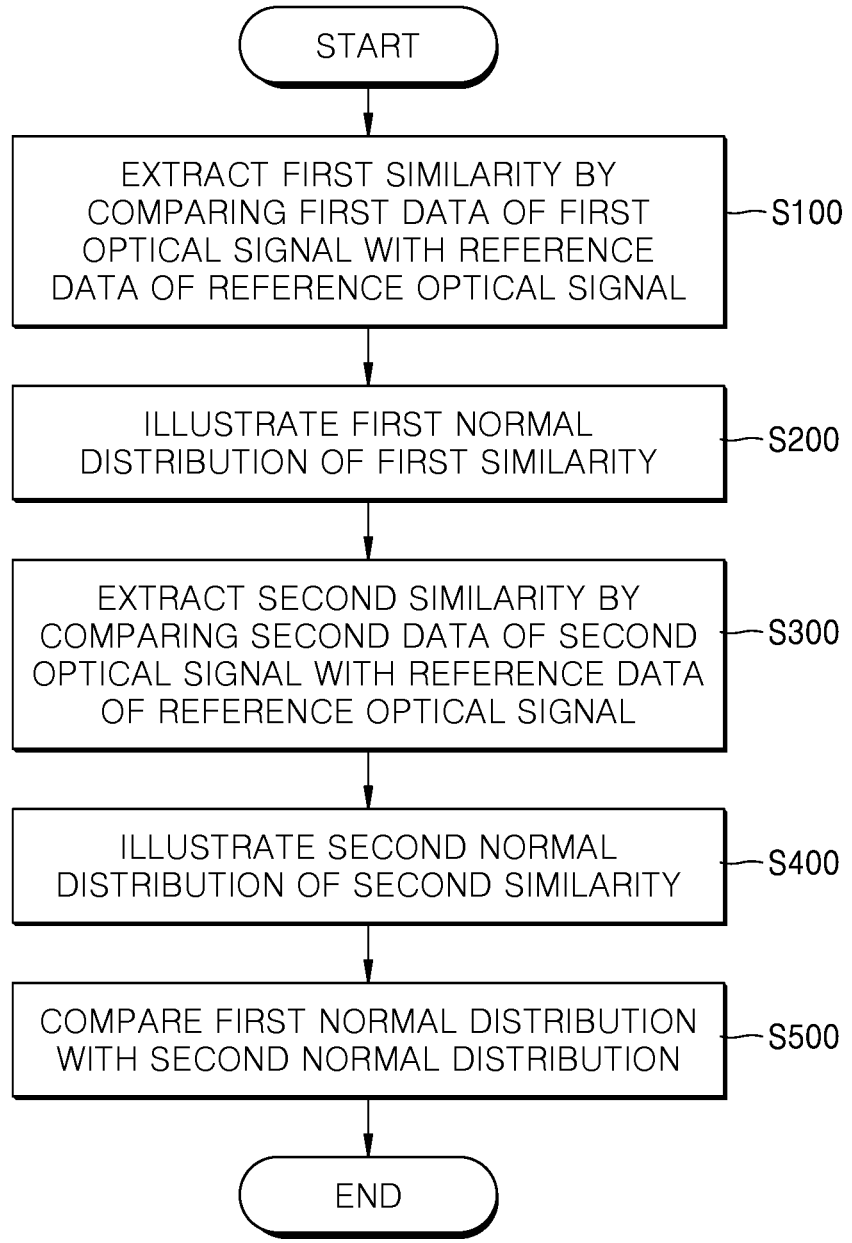

FIG. 5B

|     |   |   |   |   |   |   |   |   |     |   |   |   |   |   |   |   |   |   |
|-----|---|---|---|---|---|---|---|---|-----|---|---|---|---|---|---|---|---|---|
| 501 | 0 | 0 | 0 | 1 | 1 | 0 | 1 | 0 | ... | 0 | 0 | 0 | 0 | 1 | 0 | 1 | 0 | 0 |
| 502 | 0 | 0 | 0 | 1 | 1 | 1 | 1 | 0 | ... | 0 | 0 | 0 | 0 | 0 | 0 | 1 | 0 | 0 | i

INSPECTION METHOD, SUBSTRATE PROCESSING METHOD INCLUDING THE SAME, AND SUBSTRATE PROCESSING DEVICE USING THE SUBSTRATE PROCESSING METHOD

CROSS-REFERENCE TO RELATED APPLICATION

This application claims priority under to Korean Patent Application No. 10-2022-0108716, filed on Aug. 29, 2022 in the Korean Intellectual Property Office, the disclosure of which is incorporated by reference herein in its entirety.

BACKGROUND

The present disclosure relates to an inspection method, a substrate processing method including the inspection method, and a substrate processing device using the substrate processing method.

To manufacture a semiconductor device, by performing various processes, such as a photolithography process, an etching process, an ion implantation process, a thin layer deposition process, and a cleaning process on a substrate, a desired pattern may be formed on the substrate.

In the deposition process and the etching process, plasma may be mainly used to perform a substrate treating process. Generally, to form plasma, an electromagnetic field is formed in an inner space of a chamber, and the electromagnetic field excites a process gas provided into the chamber to a plasma state.

Plasma refers to an ionized gas state including ions, electrons, radicals, etc. Plasma is generated by high temperatures, strong electric fields, or radio frequency (RF) electromagnetic fields. For example, the etching process is performed by colliding the ionic particles contained in the plasma with the substrate.

SUMMARY

One or more example embodiments provide an inspection method having improved performance and reliability.

One or more example embodiments provide a substrate processing method including an inspection method having improved performance and reliability.

One or more example embodiments provide a substrate processing device using an inspection method having improved performance and reliability.

The issues to be addressed by one or more example embodiments are not limited to the above-described issues, and other issues not described may be addressed by one or more example embodiments and may be clearly understood by one of ordinary skill in the art from the following descriptions. Further, one or more example embodiments may not address any of the above issues. According to an aspect of an example embodiment, an inspection method includes: extracting a first similarity by comparing first data of a first optical signal with reference data of a reference optical signal; generating a first normal distribution of the first similarity; extracting a second similarity by comparing second data of a second optical signal with the reference data; generating a second normal distribution of the second similarity; and comparing the first normal distribution with the second normal distribution, wherein the extracting the first similarity by comparing the first data of the first optical signal with the reference data of the reference optical signal includes deriving the first data of the first optical signal, wherein the deriving the first data of the first optical signal includes: collecting spectrum data of the first optical signal in a chamber by using optical emission spectrometry; selecting data of a first section and data of a second section, which have a first section size, from the spectrum data; scaling each of the data of the first section and the data of the second section to a value greater than or equal to 0 and less than or equal to 1; converting the scaled data by using a fitting function $f(x)=Ae^{(-\omega|x^n|)}+c$, where n is a rational number greater than or equal to 1, and less than or equal to 5; determining a peak probability of each of the data of the first section and the data of the second section by using the fitting function; based on the peak probability of each of the data of the first section and the data of the second section being less than a reference point, converting the peak probability into 0; and based on the peak probability of each of the data of the first section and the data of the second section being equal to or greater than the reference point, converting the peak probability into 1, and wherein the reference data and the second data are derived using a method that is the same as that of the first data.

According to an aspect of an example embodiment, a substrate processing method includes: performing an inspection method for identifying a condition in a chamber; and based on the condition in the chamber being identified as a normal state, performing a plasma processing operation of processing a substrate in the chamber using plasma, wherein the inspection method includes: collecting spectrum data of a first optical signal in the chamber by using optical emission spectrometry; selecting data of a first section and data of a second section, which have a first section size, from the spectrum data; scaling each of the data of the first section and the data of the second section to a value greater than or equal to 0 and less than or equal to 1; converting the scaled data by using a fitting function $f(x)=Ae^{(-\omega|x^n|)}+c$, where n is a rational number greater than or equal to 1, and less than or equal to 5; determining a peak probability of each of the data of the first section and the data of the second section by using the fitting function; based on the peak probability of each of the data of the first section and the data of the second section being less than a reference point, converting the peak probability into 0; based on the peak probability of each of the data of the first section and the data of the second section being equal to or greater than the reference point, converting the peak probability into 1; deriving first data of the first optical signal; and extracting a first similarity by comparing the first data with reference data of a reference optical signal, and wherein the reference data and the first data are derived using a same method.

According to an aspect of an example embodiment, a substrate processing device includes: a chamber; a plasma source configured to generate plasma for processing a substrate in the chamber; an optical emission spectrometer (OES) configured to measure spectrum data of a first optical signal in the chamber; and an analysis device configured to analyze the spectrum data measured by using the OES, wherein the analysis device is further configured to: collect the spectrum data by using the OES; select data of a first section and data of a second section, which have a first section size, from the spectrum data; scale each of the data of the first section and the data of the second section to a value greater than or equal to 0 and less than or equal to 1; convert the scaled data by using a fitting function $f(x)=Ae^{(-\omega|x^n|)}+c$, where n is a rational number greater than or equal to 1, and less than or equal to 5; determine a peak probability of each of the data of the first section and the data of the second section by using the fitting function; based on the peak probability being less than a reference point, convert the peak probability into 0; based on the peak probability being equal to or greater than the reference point, convert the peak probability into 1; derive first data of the first optical signal; and extract a first similarity by comparing the first data with reference data of a reference optical signal, and wherein the reference data and the first data are derived using a same method.

BRIEF DESCRIPTION OF THE DRAWINGS

The above and other aspects and features will be more apparent from the following detailed description of one or more example embodiments taken in conjunction with the accompanying drawings in which:

FIG. 2 is a flowchart of an inspection method and a substrate processing method according to one or more example embodiments;

FIG. 5B is a diagram describing a method of extracting the first similarity in FIG. 5A, according to one or more example embodiments;

DETAILED DESCRIPTION

Figure 1:
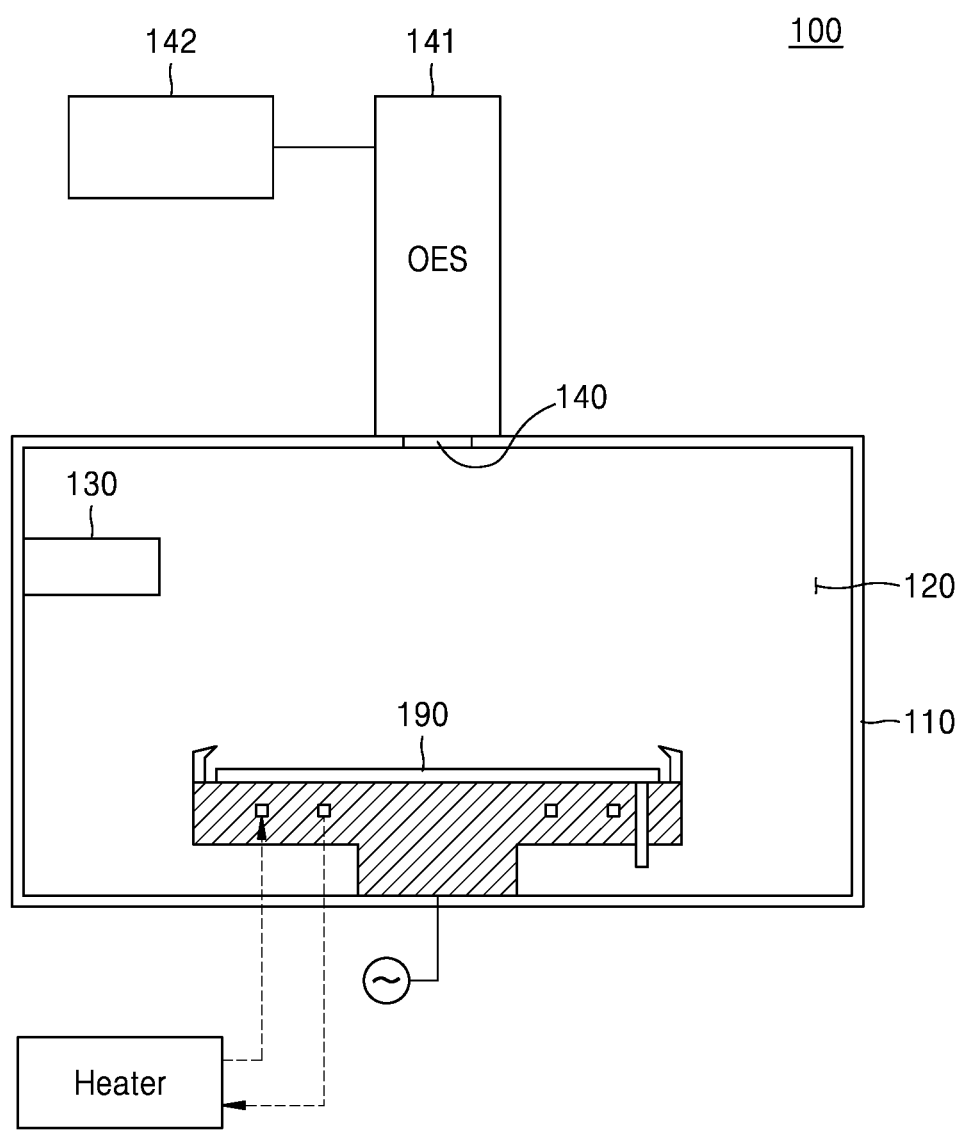
FIG. 1 is an example cross-sectional view of a substrate processing device according to one or more example embodiments.

Hereinafter, one or more example embodiments will be described in detail with reference to the accompanying drawings. The same reference numerals are used for the same components in the drawings, and duplicate descriptions thereof are omitted.

FIG. 1 is an example cross-sectional view of a substrate processing device 100 according to one or more example embodiments.

Referring to one or more example embodiments shown in FIG. 1, the substrate processing device 100 according to one or more example embodiments may include a chamber 110, a plasma source 130, optical emission spectrometry (OES) 141, and an analysis device 142.

In one or more example embodiments, the substrate processing device 100 may include the chamber 110 for performing a semiconductor process, such as an etching process, a deposition process, and a cleaning process, or the like, on the substrate 190.

In one or more example embodiments, the term "substrate" may refer to the substrate itself, or a laminated structure including the substrate and a certain layer or film formed on a surface thereof. In addition, the term "surface of the substrate" may mean an exposed surface of the substrate itself, or an exposed surface such as a certain layer or film formed on the substrate. For example, the substrate may include a wafer, or may include a wafer and at least one material layer on the wafer. The material layer may include an insulating layer and/or a conductive layer formed on a wafer by using various methods, including, but not limited to, deposition, coating, and plating. For example, the insulating layer may include an oxide layer, a nitride layer, or an oxynitride layer, and the conductive layer may include a metal layer, a polysilicon layer, etc. On the other hand, the material layer may also include a single layer or a multilayer formed on a wafer. In addition, the material layer may also be formed on the wafer with a certain pattern.

In one or more example embodiments, the chamber 110 may define a processing space 120, in which the substrate 190 may be processed. The processing space 120 may be sealed from the outside. In one or more example embodiments, the chamber 110 may include a vacuum chamber. The overall outer structure of the chamber 110 may have a cylindrical, elliptical, or polygonal column shape. The chamber 110 may generally include a metal material. The chamber 110 may also maintain an electrical ground state to block noise from the outside during various semiconductor processes.

According to one or more example embodiments, a liner may be arranged on the inner side of the chamber 110. The liner may protect the chamber 110, and cover metal structures in the chamber 110 to help prevent metal contamination due to arcing in the chamber 110 from occurring. The liner may include a metal material, including, but not limited to, aluminum and a ceramic material.

In one or more example embodiments, the plasma source 130 generating plasma for processing the substrate 190 may be arranged on the inner wall of the chamber 110. In one or more example embodiments, the plasma source 130 may generate plasma from the process gas supplied into the processing space 120. Unlike one or more example embodiments shown in FIG. 1, the plasma source 130 may be provided outside the chamber 110. The arrangement of the plasma source 130 may vary depending on the design of the substrate processing device 100. When the condition in the chamber 110 is determined to be normal, the plasma source 130 may be arranged to perform a plasma processing operation for processing the substrate 190 in the chamber 110 by using plasma.

In one or more example embodiments, an optical view port 140 may be arranged on an upper wall of the chamber 110. Light provided by the substrate 190 may be transmitted from the optical view port 140 to the OES 141 via an optical fiber. The optical view port 140 may be arranged at a position apart from an upper surface of the substrate 190 in a vertical direction. Although FIG. 1 illustrates one or more example embodiments wherein the optical view port 140 is arranged at a position apart from a center region of the substrate 190 in the vertical direction, one or more example embodiments are not limited thereto.

In one or more example embodiments, the OES 141 may be arranged on the upper wall of the chamber 110. An analysis device 142 may be connected to the OES 141. The OES 141 and the analysis device 142 may be arranged on an outer wall of the chamber 110. The OES 141 and the analysis device 142 may be arranged to perform an inspection method and a substrate processing method described with reference to FIGS. 2, 3A, 3B, 3C, 3D, 4A, 4B, 5A, 5B, 6, 7, 8A and 8B. The OES 141 and the analysis device 142 may be arranged to perform an inspection method for inspecting conditions in the chamber 110. The analysis device 142 may include, but is not limited to, for example, a memory device and a processor.

FIG. 2 is a flowchart of an inspection method and a substrate processing method according to one or more example embodiments. The inspection method and the substrate processing method in FIG. 2 may be performed by the analysis device (refer to 142 in FIG. 1).

Referring to one or more example embodiments shown in FIG. 2, a first similarity may be extracted by comparing first data of a first optical signal with reference data of a reference optical signal (S100). An operation of deriving the first similarity by comparing the first data of the first optical signal with the reference data of the reference optical signal (S100) may include an operation of extracting the first data of the first optical signal (S110 in FIG. 3A).

In one or more example embodiments, the first optical signal may include a first optical signal collected by the substrate processing device (refer to 100 in FIG. 1) described with reference to FIG. 1. In one or more example embodiments, the first optical signal may include a first optical signal collected by the chamber (refer to 110 in FIG. 1). The first optical signal may be a first optical signal collected during a process of processing a substrate, in the substrate processing device 100 including the plasma source 130 for generating plasma to process a substrate. For example, the first optical signal may include an optical signal of one or more gases present in the substrate processing device 100 at the time of collection.

In one or more example embodiments, the first optical signal may be a first comparison group. The first optical signal may include a first optical signal collected during a target substrate treating process to check whether outdoor air is introduced and/or gas is mixed in the chamber 110. In one or more example embodiments, the introduction of the outdoor air may include the case in which gas is introduced from the outside in addition to the process gas, and the mixing of gas may include the case in which an unexpected gas is mixed during the substrate treating process. For example, the first optical signal may include a first optical signal, which checks whether the outdoor air is introduced into the chamber 110 and/or gas is mixed, and determines whether the substrate treating process is to be continued according to a result thereof.

In one or more example embodiments, the reference optical signal may be a comparison group. The reference optical signal may include a reference optical signal collected in the case in which the outdoor air is introduced and/or gas mixing does not occur in the chamber 110 during the substrate treating process. In other words, the reference optical signal may include a reference optical signal collected during an ideal (or normal) substrate treating process.

In one or more example embodiments, each of the first data and the reference data may have a binary vector. In other words, the first data and the reference data may have binary matrices, in which values of all elements are 0 or 1. In one or more example embodiments, the first data and the reference data may have binary matrices having the same size. In other words, the first data and the reference data may have binary matrices, in which the number of all elements are the same. In one or more example embodiments, the first similarity may include a value obtained by comparing the first data with the reference data.

A process of comparing the first data with the reference data and extracting the first similarity is described in detail with reference to one or more example embodiments shown in FIGS. 5A and 5B.

Referring to one or more example embodiments shown in FIG. 2, a first normal distribution of the first similarity may be illustrated (S200).

In one or more example embodiments, the operation of extracting the first similarity (S100) may be repeated L times (L is a natural number of 1 or more) to obtain L of first similarities, and a distribution of L of first similarities may be illustrated. Illustration of the first normal distribution of the first similarity (S200) is described in detail with reference to one or more example embodiments shown in FIG. 7.

Referring to one or more example embodiments shown in FIG. 2, the second similarity may be extracted by comparing second data of a second optical signal with the reference data of the reference optical signal (S300).

In one or more example embodiments, the second optical signal may include a second optical signal collected in the substrate processing device (refer to 100 in FIG. 1). In one or more example embodiments, the second optical signal may include a second optical signal collected in the chamber (refer to 110 in FIG. 1). In other words, the second optical signal may include an optical signal collected in the substrate processing device 100 or the chamber 110, which is the same as the first optical signal. The second optical signal may include a second optical signal collected during a process of processing a substrate, in the substrate processing device 100 including the plasma source 130 for generating plasma to process a substrate. For example, the second optical signal may include an optical signal of one or more gases present in the substrate processing device 100 at the time of collection.

In one or more example embodiments, the second optical signal may be a second comparison group. The second optical signal may include a second optical signal in a normal case to be compared with the first optical signal. For example, the second optical signal may include a second optical signal collected during a normal substrate treating process, in which it is identified that no the outdoor air inflow and/or gas mixing has occurred in the vacuum chamber. Alternatively, in one or more example embodiments, the second optical signal may be the same as the reference optical signal. In other words, according to one or more example embodiments, comparing the second optical signal with the reference optical signal may be the same as comparing those within the same optical signal.

In one or more example embodiments, the second data may have a binary matrix like the first data and the reference data. In other words, the second data may have a binary matrix, in which values of all elements are 0 or 1, and may have the same size as the first data and the reference data. In one or more example embodiments, the second similarity may include a value obtained by comparing the second data with the reference data.

Referring to one or more example embodiments shown in FIG. 2, a second normal distribution of the second similarity may be illustrated (S400).

In one or more example embodiments, the operation of extracting the second similarity (S300) may be repeated K times (K is a natural number of 1 or more) to obtain K of second similarities, and a distribution of K of second similarities may be illustrated. Illustration of the second normal distribution of the second similarity (S400) is described in detail with reference to one or more example embodiments shown in FIG. 7.

Referring to one or more example embodiments shown in FIG. 2, the first normal distribution may be compared with the second normal distribution (S500).

The comparing of the first normal distribution with the second normal distribution (S500) may include comparing the average of the first normal distribution with the average of the second normal distribution, or comparing the dispersion of the first normal distribution with the dispersion of the second normal distribution. The comparing of the first normal distribution with the second normal distribution (S500) is described in detail with reference to one or more example embodiments shown in FIG. 7.

In one or more example embodiments, when the first optical signal is the first comparison group, the second optical signal is the second comparison group, and the reference optical signal is a control group, the comparing of the first normal distribution with the second normal distribution (S500) may include analyzing and comparing the optical signals of the first comparison group and the second comparison group with the optical signal of the control group.

Figure 3A:
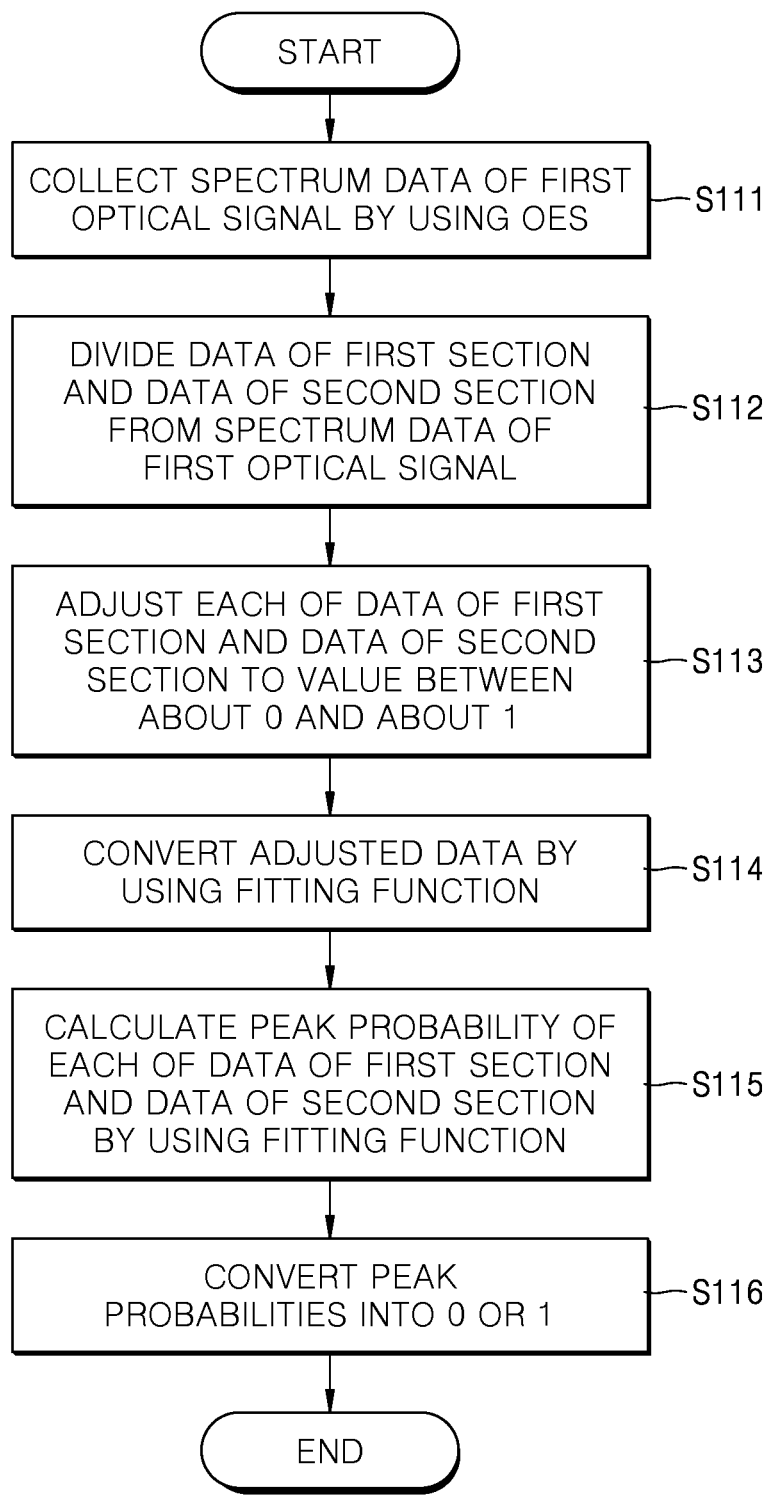
FIG. 3A is a flowchart of a method of deriving first data of a first optical signal in an inspection method and a substrate processing method, according to one or more example embodiments.
Figure 3B:
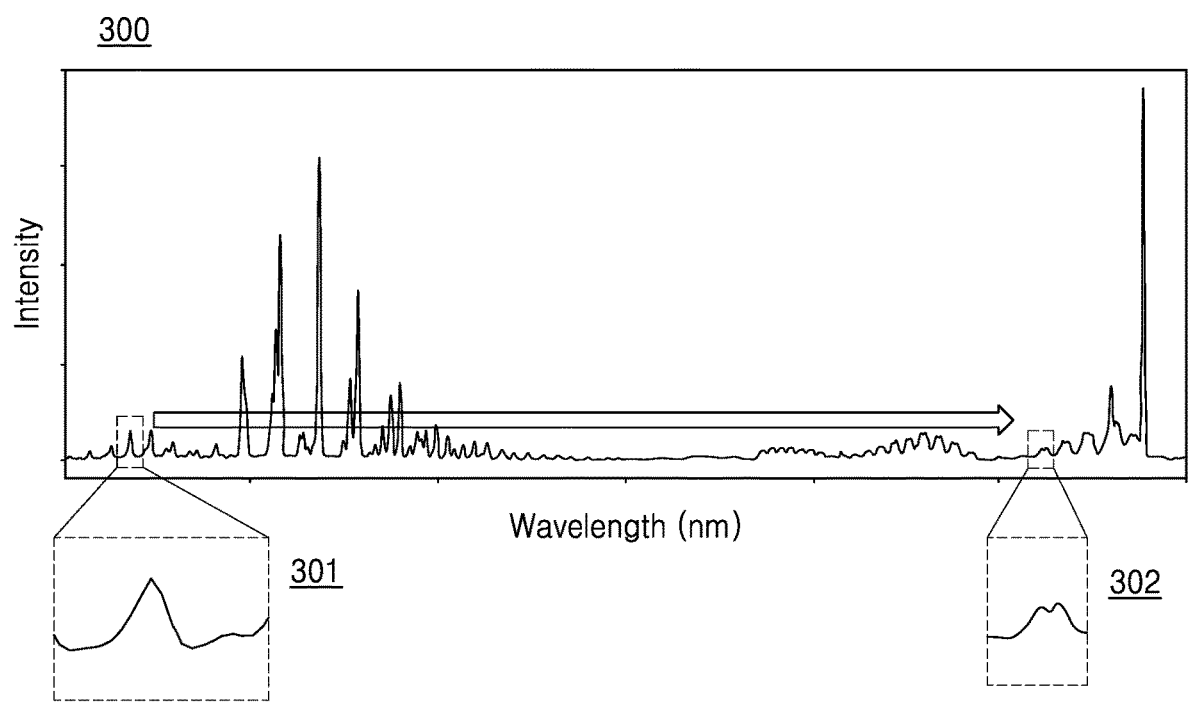
FIGS. 3B, 3C and 3D are diagrams describing a method of deriving the first data of the first optical signal in FIG. 3A, according to one or more example embodiments.
Figure 3C:
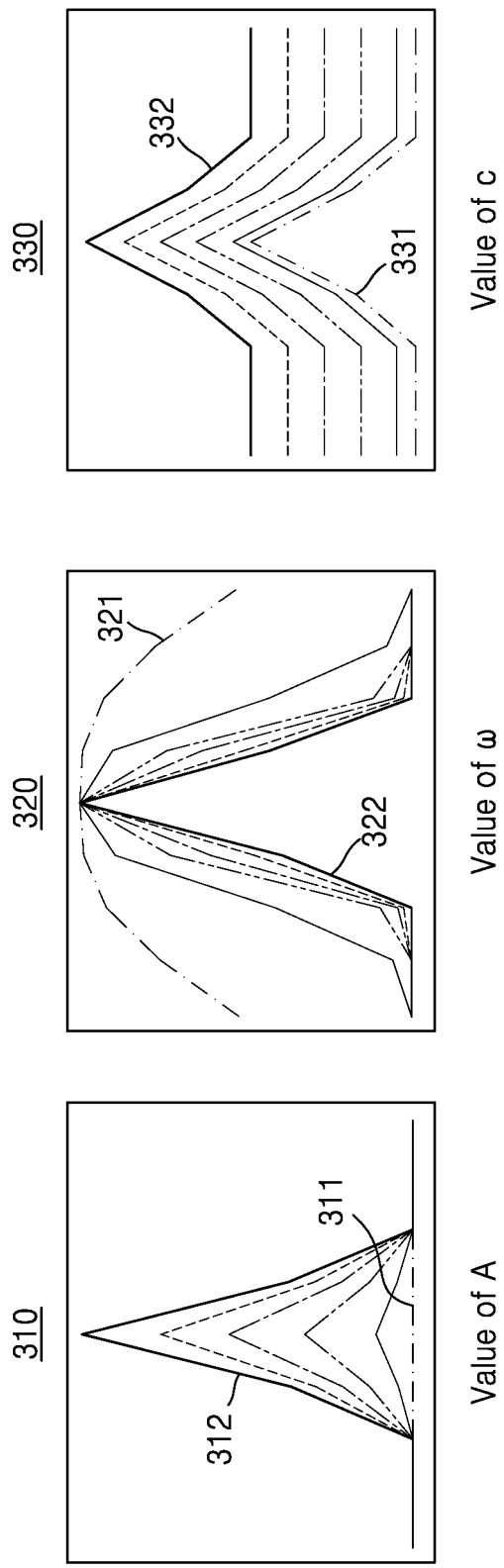
Figure 3D:
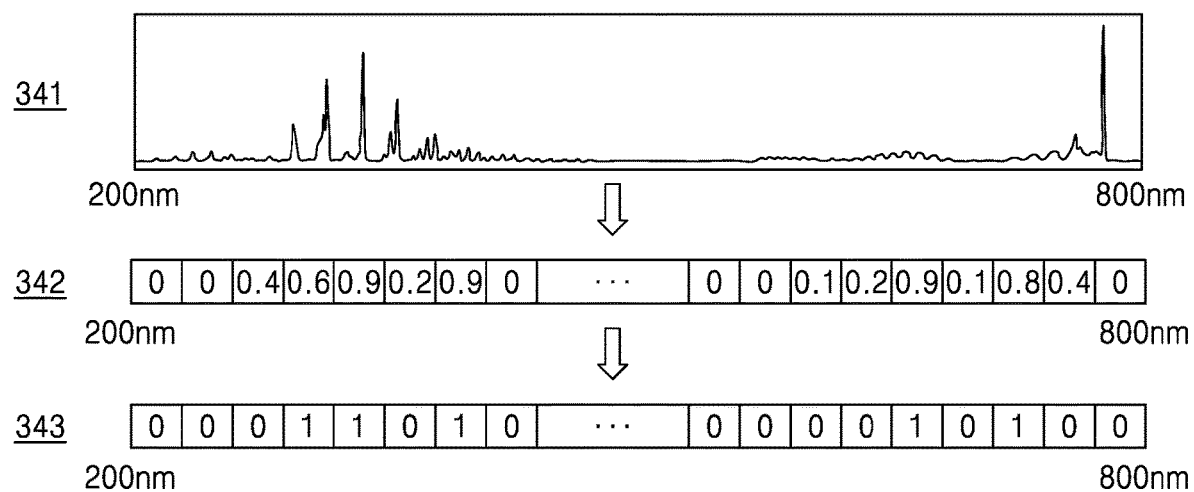

FIG. 3A is a flowchart of a method of deriving first data of a first optical signal (S110) in an inspection method and a substrate processing method, according to one or more example embodiments. FIGS. 3B, 3C and 3D are diagrams describing a method of deriving the first data of the first optical signal according to one or more example embodiments.

Referring to one or more example embodiments shown in FIG. 3A, by using the OES (refer to 141 in FIG. 1), spectrum data of the first optical signal in the chamber (refer to 110 in FIG. 1) may be collected (S111).

In one or more example embodiments, the spectrum data of the first optical signal may be obtained by measuring the first optical signal transmitted via an optical fiber in the optical view port (refer to 140 in FIG. 1) of the substrate processing device (refer to 100 in FIG. 1). The spectrum data of the first optical signal may include spectrum data including the intensity of an optical signal for each wavelength obtained by spectralizing the first optical signal by using the OES 141. In one or more example embodiments, the spectrum data of the first optical signal may include full spectrum data in the full wavelength region. In one or more example embodiments, the full wavelength region may include a visible light wavelength region. In other words, the spectrum data of the first optical signal may be collected in a region of about 200 nm to about 800 nm.

Referring to one or more example embodiments shown in FIG. 3A, data of a first section and data of a second section, which have a first section size, may be divided from the spectrum data of the first optical signal (S112).

The first section size may have a wavelength value indicating an arbitrary wavelength range. In one or more example embodiments, the full spectrum data of the first optical signal may be divided by moving each time one interval of the first section size. Referring to one or more example embodiments shown in FIG. 3B, a full spectrum data 300 may represent a wavelength (nm) in the horizontal axis and an intensity in the vertical axis. For example, referring to one or more example embodiments shown in FIG. 3B, the full spectrum data 300 may be divided into data of a first section 301 and data of a second section 302. For example, the full spectrum data 300 may be divided into a plurality of sections including the first section 301 and the second section 302. In other words, the full spectrum data 300 may be divided into a plurality of sections having the first section size, and the plurality of sections may include divided spectrum data, which indicate intensities in wavelength sections adjacent to each other.

In one or more example embodiments, for example, the first section size may be about 4 nm, and the spectrum data may be divided in an about 4 nm intervals. In one or more example embodiments, when the spectrum data has been collected for between about 200 nm to about 800 nm, the spectrum data may be divided into 150 sections each having a size of about 4 nm. For example, the first section may be between about 200 nm and about 204 nm, and the second section may be between about 204 nm and about 208 nm. The first section size may have various values depending on one or more example embodiments. For example, the first section size may have a value less than about 4 nm, or may also have a value greater than about 4 nm. By dividing the full spectrum data, a plurality of divided spectrum data, each having the first section size may be obtained.

Referring to one or more example embodiments shown in FIG. 3A, each of the data of the first section and the data of the second section may be scaled, or adjusted, to a value of between about 0 or more, and about 1 or less (S113).

In one or more example embodiments, the plurality of divided spectrum data may each have a minimum value, a maximum value, and a value therebetween, and the minimum values, the maximum values, and the values therebetween may be different from each other. The minimum values, the maximum values, and the values therebetween, which are different from each other, of each of the plurality of divided spectrum data may be scaled to values of between about 0 or more, and about 1 or less.

In one or more example embodiments, the conversion may be performed by using the following method. First, the maximum value and the minimum value in the first section may be set to about 1 and about 0, respectively, and values, that are neither the maximum value nor the minimum value, may be scaled to values between about 0 and about 1 based on a difference between the maximum value and the minimum value in the first section. By repeating the scaling process, the plurality of divided spectrum data, in which the maximum values and the minimum values have been scaled to about 1 and about 0, respectively, may be obtained.

By using the scaling process, the maximum value and the minimum values of the divided spectrum data of the entire sections may be fixed to certain values, only a shape, not a size of an intensity value, for each wavelength may be considered, and thus, even a small peak may be detected.

Referring to one or more example embodiments shown in FIG. 3A, the scaled divided spectrum data obtained in operation S113 may be converted by using Formula 1, which is a fitting function, f(x) below (S114):

$$f(x) = Ae^{-\omega|x^n|} + c \qquad \text{Formula 1}$$

In one or more example embodiments, A may mean an amplitude of a peak, ω may mean a width of a peak, and c may mean a pedestal of a peak. Each of the A, the ω, and the c may have values of between about 0 or more, and about 1 or less. In one or more example embodiments, n in Formula 1 may include a positive rational number. For example, the n may include a rational number between about 1 or more, and about 5 or less. For example, the n may include 3. In one or more example embodiments, x in Formula 1 may mean a scaled wavelength value in each section. For example, in the fitting function f(x), a point, where x=0, may mean a middle point of a wavelength region in each section. For example, when the first section is between about 200 nm and about 204 nm, the fitting function, f(x=0), in the case of x=0 may mean the spectrum data for the case, in which the wavelength is about 202 nm. In other words, by performing a process of converting data scaled in the operation S113 by using the fitting function, f(x), values of factors corresponding to a height, a width, and a pedestal value of a peak may be obtained. By performing a converting process by using the fitting function, f(x), the values of A, ω, and c may be obtained.

Referring to one or more example embodiments shown in FIG. 3C, as the values of A, ω, and c change, shapes of peaks of graphs represented by the fitting function, f(x), may change. In one or more example embodiments shown in FIG. 3C, graphs 310, 320, and 330 may represent that the shapes of the peaks change as the value of A, the value of ω, and the value of c, change, respectively.

Referring to a graph 310, as the value of A increases, the height of the peak may increase. For example, the case of a higher value of A referenced by 312 may have a higher peak than the case of a lower value of A referenced by 311. In other words, as the value of A approaches 0, the height of the peak may decrease, and as the value of A approaches 1, the height of the peak may increase.

Referring to a graph 320, as the value of ω increases, the width of the peak may increase. For example, the case of a higher value of ω referenced by 322 may have a narrower width of the peak than the case of a lower value of ω referenced by 321. In other words, as the value of ω approaches about 0, the width of the peak may become wider and the shape of the peak may have a gentle shape, and as the value of ω approaches about 1, the width of the peak may become narrower and the shape of the peak may have a pointed shape.

Referring to the graph 330, as the value of c increases, the pedestal value of the peak may increase. For example, the case of a higher value of referenced by c 332 may have a greater pedestal value than the case of a lower value of c referenced by 331. In other words, as the value of c approaches about 0, the pedestal value may decrease, and as the value of c approaches about 1, the pedestal value may increase.

As described above, the values of A, ω, and c may have values of between about 0 or more, and 1 or less, and accordingly, by using a function, f(x: A, ω, c), for the values of A, w, and c having values between about 0 and about 1, a difference R between the function, f(x: A, ω, c), and data scaled in operation S113 may be calculated. The function, f(x: A, ω, c), for the case, in which the difference R between the function, f(x: A, ω, c), and the data scaled in operation S113 is minimum, may be defined as a fitting function, (f(x)), in the corresponding section.

Referring to one or more example embodiments shown in FIG. 3A, by using the fitting function, (f(x)), peak probabilities of data in each of the first section and the second section may be calculated (S115).

The peak probability may include an indicator that quantifies how close to the peak data a corresponding section is. In other words, the peak probability may be an indicator meaning a probability that a peak exists in a particular wavelength section band. The peak probability may be calculated by using the fitting function, f(x), derived in operation S114.

In one or more example embodiments, the peak probability may be calculated by considering how well the peak probability matches the fitting function, f(x), that is, by considering an average of the differences R between the fitting function, f(x), and the data converted in operation S113. In one or more example embodiments, the peak probability may be calculated by considering the height of the peak when the peak probability well matches the fitting function, f(x), that is, by considering the value of A of the fitting function, f(x). The peak probability may be calculated by using Formula 2 below:

$$\text{peak probability} = A \times (1-R) \quad \text{Formula 2}$$

The peak probability may be calculated as a value between about 0 or more, and about 1 or less. According to Formula 2, as the value of A, which is a factor corresponding to a height of a peak, is closer to about 1, and as the average of the differences R between the fitting function, f(x), and the data converted in operation S113 is closer to about 0, the peak probability in the corresponding section may increase. A root of square sum may be used as the average of the differences R. In other words, as the value of A is closer to about 1, and the value of the difference R is closer to about 0, the peak probability in the corresponding section may be closer to about 1.

Referring to one or more example embodiments shown in FIG. 3D, by performing a process of converting spectrum data 341 into a peak probability data 342, the full spectrum data may be converted into a peak probability having a value of between about 0 or more, and about 1 or less in each of the first section and the second section, which have the first section size. In other words, by performing a process of converting the spectrum data 341 into the peak probability data 342, the full spectrum data may be converted into a peak probability having a value of between about 0 or more, and about 1 or less in a plurality of sections having the first section size.

Referring to one or more example embodiments shown in FIG. 3A, when the respective peak probabilities of data of the first section and the second section calculated in operation S115 are less than a reference point, the respective peak probabilities may be converted into 0, and when the respective peak probabilities are the reference point or more, the respective peak probabilities may be converted into 1 (S116).

Referring to one or more example embodiments shown in FIG. 3D, by performing a process of converting the peak probability data 342 into a scaled peak probability data 343 of binary matrix obtained by processing the peak probability data 342, the respective peak probabilities of data in the first section and the second section may be converted into values of either 0 or 1. In other words, by performing the conversion process, the respective peak probabilities of data of the plurality of sections, which are calculated in operation S115, may be converted into values of 0 or 1.

In one or more example embodiments, the reference point may have a value greater than about 0, and less than or equal to about 1. For example, when the reference point is about 0.5, the peak probability may be converted to 0 in a section, in which the peak probability is less than about 0.5, and the peak probability may be converted to 1 in a section, in which the peak probability is equal to or greater than 0.5.

In one or more example embodiments, the reference data of the reference optical signal and the second data of the second optical signal may be derived in similar method as the first data of the first optical signal. In other words, the reference data and the second data may be derived by using a method including operations S11, S112, S113, S114, S115 and S116. In other words, derivation of the reference data and the second data may include operation of dividing data into a plurality of sections having the first section size.

Based on an inspection method and a substrate processing method according to one or more example embodiments described with reference to FIGS. 3A, 3B, 3C and 3D, an inspection method of comparing only the peak probability of the spectrum data of an optical signal generated in the substrate treating process may be provided. By using the inspection method, not only whether an expected particular gas is introduced, for example, whether a nitrogen gas is introduced, but whether an unexpected gas is introduced, may be inspected. By using the inspection method, it may be possible to inspect changes in fine spectrum data due to fine gas inflow or leakage. Based on the inspection method, there may be no need to input a separate particular wavelength, for example, a wavelength of about 337.1 nm in the case of nitrogen gas, to inspect whether a peak is observed at the particular wavelength. By using the inspection method, there may be no restriction on a process gas, which may be inspected. For example, the inspection method of comparing only the peaks of the spectrum data cannot inspect whether an outdoor gas is introduced or gas is mixed for a substrate treating process using the nitrogen gas as a process gas, but by using the inspection method according to one or more example embodiments, whether gas is introduced or gas is mixed may be inspected even for a process using the nitrogen gas as the process gas. By using the inspection method, it may not be necessary to consider an intensity change of an optical signal caused by contamination in the optical view port (refer to 140 in FIG. 1) of the substrate processing device (refer to 100 in FIG. 1). By using the inspection method, it may not be necessary to perform background reduction and interpolation to adjust the zero intensity.

One or more example embodiments provide an inspection method having improved performance and reliability, a substrate processing method including the inspection method, and a substrate processing device using the inspection method, according to one or more example embodiments described with reference to FIGS. 3A, 3B, 3C and 3D.

Figure 4A:
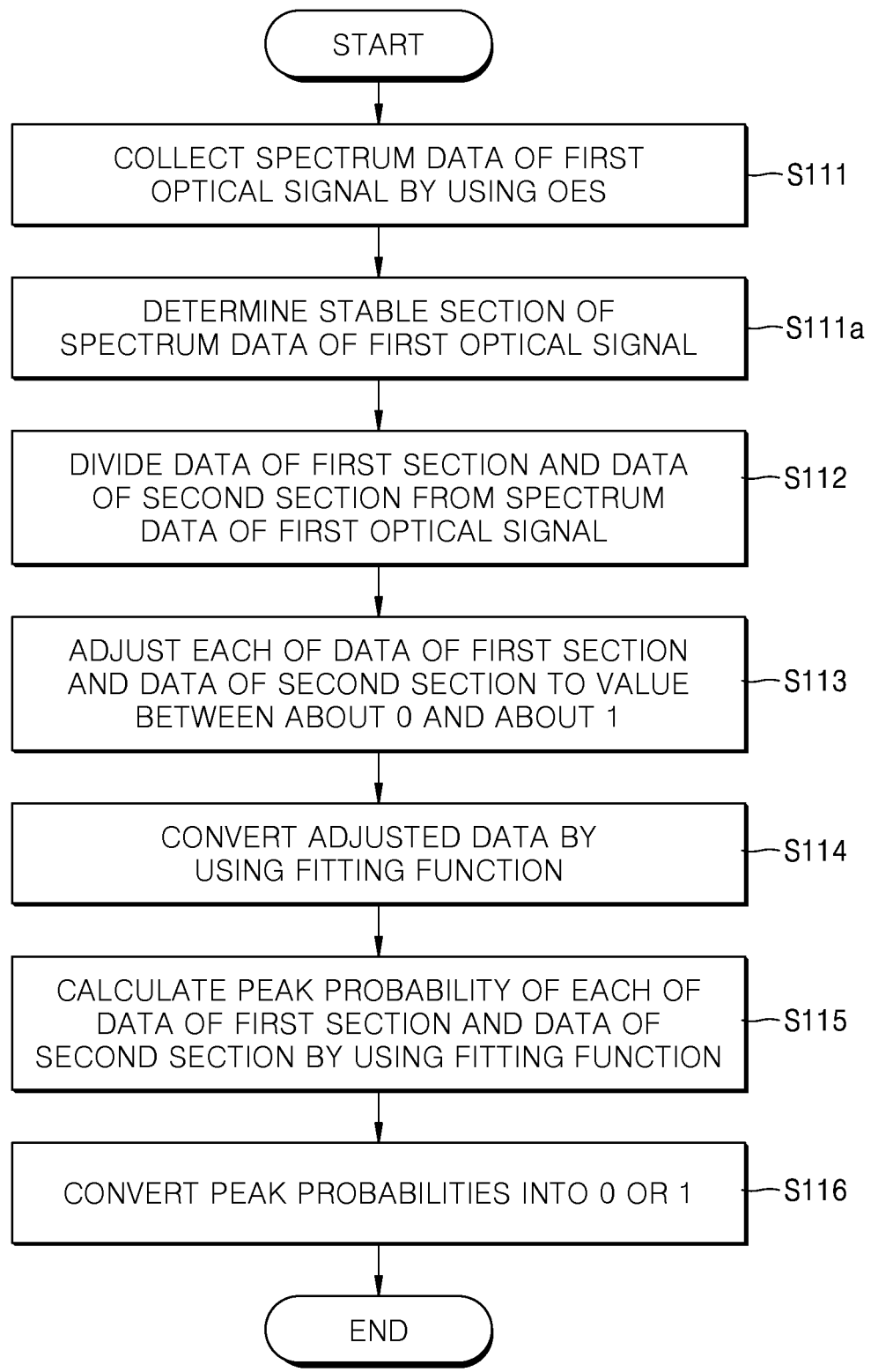
FIG. 4A is a flowchart of a method of deriving first data of a first optical signal in an inspection method and a substrate processing method, according to one or more example embodiments.
Figure 4B:
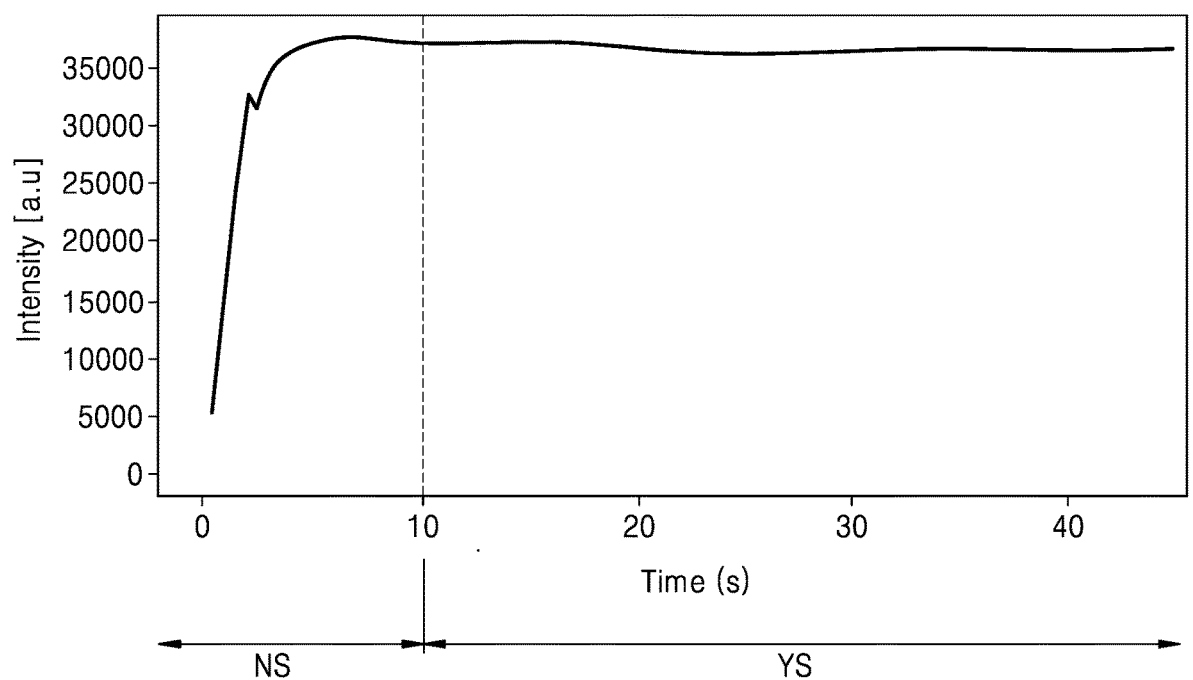
FIG. 4B is a diagram describing a method of deriving the first data of the first optical signal in FIG. 4A, according to one or more example embodiments.

FIG. 4A is a flowchart of a method of deriving the first data of the first optical signal in an inspection method and a substrate processing method, according to one or more example embodiments. FIG. 4B is a diagram describing a method of deriving the first data of the first optical signal in FIG. 4A, according to one or more example embodiments.

Referring to one or more example embodiments shown in FIG. 4A, an operation of deriving the first data of the first optical signal (S110a) may, in addition to including operations similar to operations described with reference to one or more example embodiments above, may further include an operation of determining a stable time section YS of the spectrum data of the first optical signal (S111a).

Referring to one or more example embodiments shown in FIG. 4B, the full spectrum data (refer to S111 in FIG. 1) collected by using the OES (refer to 141 in FIG. 1) may include a non-stable time section NS and a stable time section YS. In one or more example embodiments, the non-stable time section NS may include a section, in which a value of data more rapidly changes over time, and the stable time section YS may include a section, in which a value of data does not change as rapidly over time. The non-stable time section NS and the stable time section YS may be differentiated in terms of time. For example, about 0 to about 10 seconds may be the non-stable time section NS, and about 10 to about 50 seconds may be the stable time section YS. For example, the non-stable time section NS and the stable time section YS may be defined based on a reference time point. For example, the non-stable time section NS may be defined as a time from the starting point of plasma generation to a first time point, and the stable time section YS may be defined as a time from the first time point to a second time point.

In one or more example embodiments, the first section and the second section (refer to S112 in FIG. 3A) may be divided from the stable time section YS. In other words, a time point, at which the first section is divided from the second section, may be selected from the stable time section YS. In other words, the optical signal collected in the non-stable time section NS may not be used in collecting the spectrum data in operation S111, but the optical signal collected during the stable time section YS may be utilized in collecting the spectrum data in operation S111.

Figure 5A:
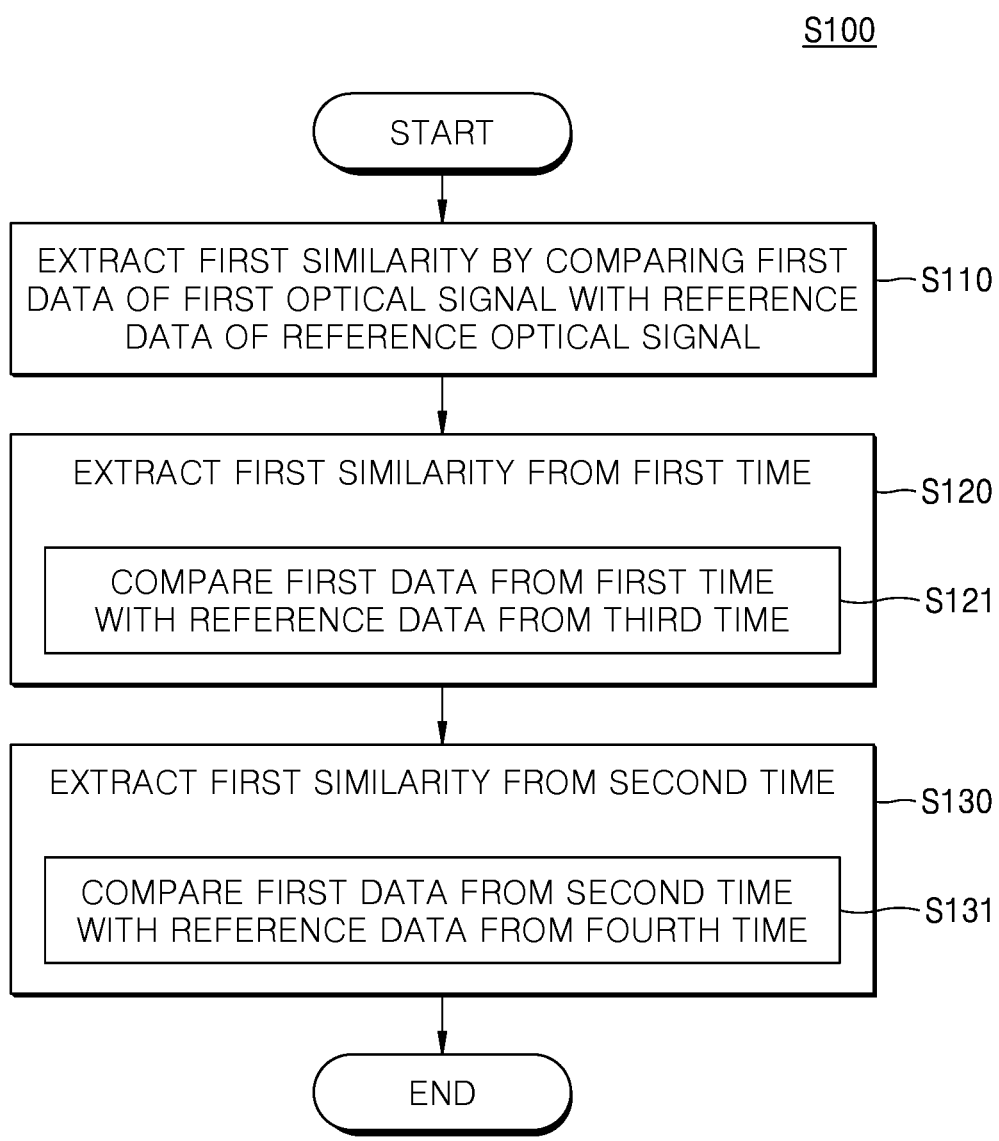
FIG. 5A is a flowchart of a method of extracting a first similarity in an inspection method and a substrate processing method, according to one or more example embodiments.

FIG. 5A is a flowchart of a method of extracting the first similarity S100 in an inspection method and a substrate processing method, according to one or more example embodiments. FIG. 5B is a diagram describing the method of extracting the first similarity S100 in FIG. 5A, according to one or more example embodiments.

Referring to one or more example embodiments shown in FIG. 5A, the first data of the first optical signal may be derived (S110). The operation S110 of deriving the first data of the first optical signal has been described above with reference to FIGS. 3A, 3B, 3C and 3D. In one or more example embodiments, the first data of the first optical signal may be derived from a first time.

Referring to one or more example embodiments shown in FIG. 5A, the first similarity may be extracted from the first time (S120). In one or more example embodiments, the first data of the first optical signal may be compared with the reference data of the reference optical signal.

In one or more example embodiments, the first similarity may include a value obtained by comparing the first data with the reference data. Referring to one or more example embodiments shown in FIG. 5B, the first similarity may include a value obtained by using elementwise comparison of scaled peak probability data (refer to 343 in FIG. 3D), which are binary matrices of the same size. For example, the first similarity may be a probability of the number of the cases, in which $i^{th}$ elements (i is a natural number of n or less) of first data 501 and reference data 502, each of which has n elements (n is a natural number of 1 or more), are the same as each other. In other words, the first similarity may be expressed as a value of between about 0 or more, and about 1 or less, or a percentage value of between about 0% or more, and about 100% or less. For example, when the number of cases, in which the $i^{th}$ elements of the first data and the reference data are all 0's or all 1's, is m (m is a natural number equal to or less than n), the value of the first similarity may be m/n.

In one or more example embodiments, because each section of the first data and the reference data means a particular wavelength region, for example, about 200 nm to about 204 nm, the elementwise comparison of the first data with the reference data may include comparison of data in the same wavelength region of the first data and the reference data.

In one or more example embodiments, the first data of the first optical signal may be derived from the first time, and the first data may be compared with the reference data derived from a third time of the reference optical signal (S121). For example, when the reference time point is about 0 seconds, the first time may be about 10 seconds, and the third time may be about 30 seconds. In one or more example embodiments, the first data of the first optical signal may be derived from the first time, and may be compared with the reference data derived from the first time of the reference optical signal. For example, both the first data and the reference data may be derived from about 10 seconds. In other words, extracting the first similarity from the first time may include comparing the first data with the reference data, which are derived at the same time, and comparing the first data with the reference data, which are derived at different times.

Referring to one or more example embodiments shown in FIG. 5A, the first similarity may be extracted from a second time (S130). In one or more example embodiments, the first data of the first optical signal may be derived from the second time, and the first data may be compared with the reference data derived from a fourth time of the reference optical signal (S131). In one or more example embodiments, the first data of the first optical signal may be derived from the second time, and may be compared with the reference data derived from the second time of the reference optical signal. Extracting the first similarity from the second time (S130) may be performed by using a method similar to extracting the first similarity from the first time (S120).

Figure 6:
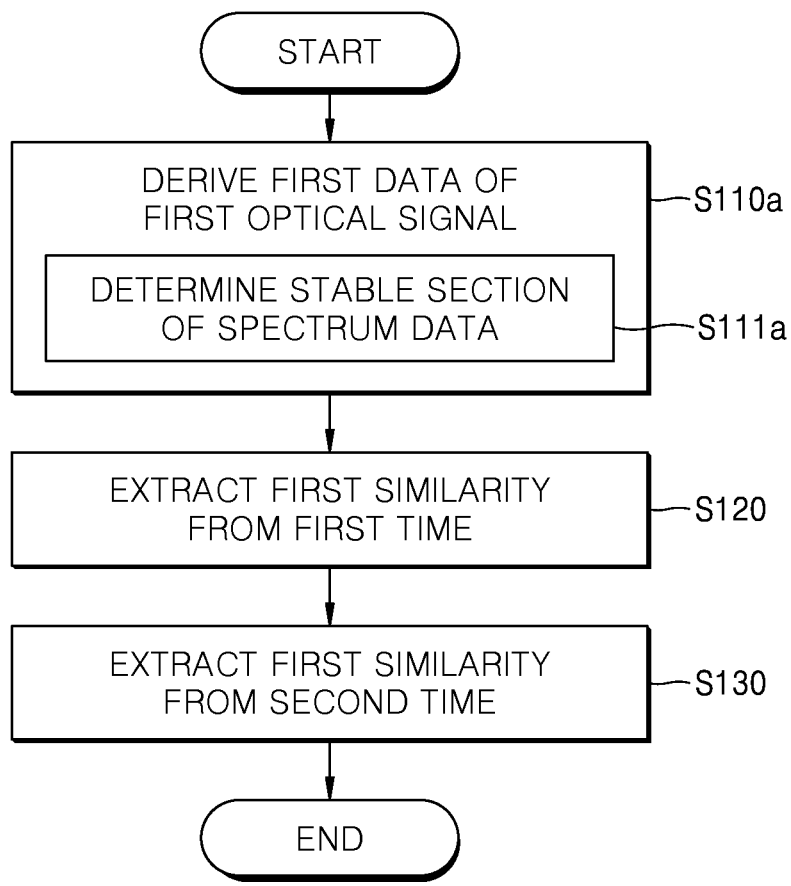
FIG. 6 is a flowchart of a method of extracting a first similarity in an inspection method and a substrate processing method, according to one or more example embodiments.

FIG. 6 is a flowchart of a method of extracting the first similarity in an inspection method and a substrate processing method, according to one or more example embodiments.

Referring to one or more example embodiments shown in FIG. 6, the operation of deriving the first data of the first optical signal (S110a) may further include an operation of determining the stable time section YS of the spectrum data of the first optical signal (S111a). In other words, the operation of extracting the first similarity by comparing the first data with the reference data of the reference optical signal (S100a) may further include the operation of determining the stable time section YS of the spectrum data of the first optical signal (S111a).

In one or more example embodiments, as described above with reference to FIGS. 4A and 4B, the full spectrum data (refer to S111 in FIG. 1) collected by using the OES (refer to 141 in FIG. 1) may include the non-stable time section NS and the stable time section YS, and the first section and the second section may be divided from the stable time section YS.

In one or more example embodiments, the first time and the second time (refer to S112 in FIG. 3A) may be divided from the stable time section YS. In other words, the first time and the second time may be included in the stable time section YS. For example, the first section and the second section may be divided from the full spectrum data from the first time selected in the stable time section YS.

Figure 7:
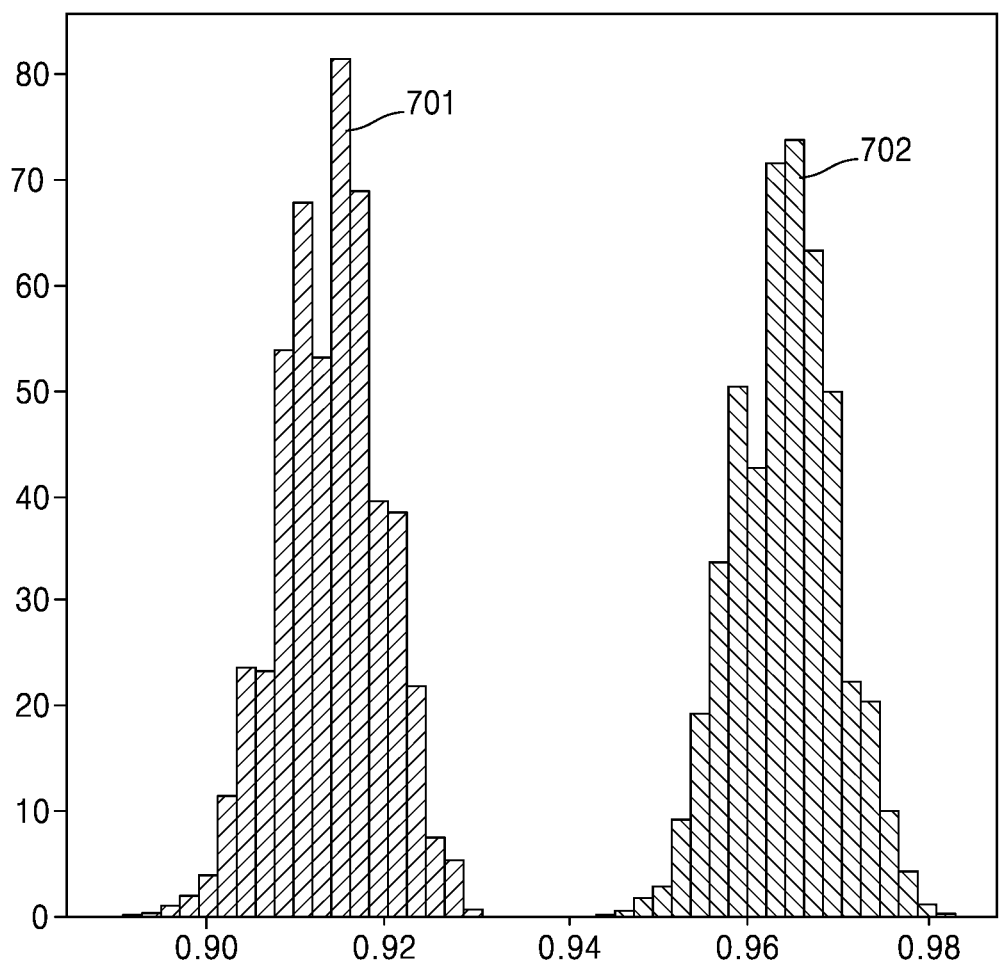
FIG. 7 is a diagram for describing an operation of representing a first normal distribution of a first similarity, an operation of representing a second normal distribution of a second similarity, and an operation of representing the first normal distribution and the second normal distribution in an inspection method and a substrate processing method, according to one or more example embodiments.

FIG. 7 is a diagram for describing an operation of representing a first normal distribution 701 of the first similarity (refer to S200 in FIG. 2), an operation of representing a second normal distribution 702 of the second similarity (refer to S400 in FIG. 2), and an operation of representing the first normal distribution 701 and the second normal distribution 702 (refer to S500 in FIG. 2), in the inspection method and the substrate processing method, according to one or more example embodiments.

Referring to one or more example embodiments shown in FIG. 7, the first normal distribution of the first similarity may be illustrated (S200).

In one or more example embodiments, the operation of extracting the first similarity (S100) may be repeated L (L is a natural number of 1 or more) times to obtain L of the first similarities. For example, the operation of extracting the first similarity (S100) may be repeated about 500 times.

In one or more example embodiments, repeating L times the operation of obtaining the first similarity (S100) may include repeating L times the operation of obtaining the first similarity (S100) with respect to the first optical signals collected in different time sections. For example, the repeating the operation of obtaining the first similarity (S100) L times may include extracting the first similarity (refer to S120 in FIG. 5A) with respect to the first optical signal collected at the first time, and extracting the first similarity (refer to 130 in FIG. 5A) with respect to the first optical signal collected at the second time. In one or more example embodiments, the first time and the second time may be selected in the stable time section YS determined by using operation S111a in the one or more example embodiments shown in FIGS. 4A and 6. For example, extracting the first similarity may include extracting the first similarity with respect to the first optical signal collected from the first time through the $L^{th}$ time. In one or more example embodiments, the first time through the $L^{th}$ time may be selected in the stable time section YS determined by performing operation S111a in the one or more example embodiments shown in FIGS. 4A and 6.

In one or more example embodiments, it may be possible to illustrate the distribution of L of the first similarities 701 obtained by repeating L times the operation of extracting the first similarity (S100). The distribution of the first similarity may have the shape of a normal distribution. The distribution of the first similarity may have the shape close to a normal distribution. In other words, the distribution of the first similarity may have a maximum value at a position close to an medium value or an average value, and may have a shape close to a bell shape, in which the value of the distribution decreases as it moves away from the position of the maximum value.

Referring to one or more example embodiments shown in FIG. 7, the second normal distribution of the second similarity may be illustrated (S400).

In one or more example embodiments, the operation of extracting the second similarity (S300) may be repeated K (K is a natural number of 1 or more) times to obtain K of the second similarities. In one or more example embodiments, the value of K may be equal to the value of L. For example, the operation of extracting the second similarity (S300) may be repeated about 500 times. In other words, the number of repetition of extracting the second similarity (S300) may be the same as the number of repetition of extracting the first similarity (S100). In one or more example embodiments, the value of K may be different from the value of L. In other words, the number of repetitions of extracting the second similarity (S300) may be different from the number of repetitions of extracting the first similarity (S100).

In one or more example embodiments, repetition of the operation of extracting the second similarity (S300) K times may be similarly performed as repetition of the operation of extracting the first similarity (S100) L times.

In one or more example embodiments, it may be possible to illustrate the distribution of K of the second similarities (701 in FIG. 7) obtained by repeating K times the operation of extracting the second similarity (S300). The distribution of the second similarity may have the shape of a normal distribution. In other words, the distribution of the second similarity may have the shape close to a normal distribution.

Referring to one or more example embodiments shown in FIG. 7, the first normal distribution 701 may be compared with the second normal distribution 702 (S500).

In one or more example embodiments, as illustrated in FIG. 7, the first normal distribution 701 and the second normal distribution 702 may illustrate normal distribution curves formed at different positions from each other. For example, the first normal distribution 701 and the second normal distribution 702 may have different medium values from each other. For example, the first normal distribution 701 and the second normal distribution 702 may have different average values from each other.

In one or more example embodiments, when the second optical signal is a second optical signal in a normal case of being a comparison target with respect to the first optical signal, the second optical signal may be similar to the reference optical signal. In other words, in one or more example embodiments, the second similarity of the second optical signal to the reference optical signal may have a value close to about 1. The K of the second similarities extracted by repeating K times may also have values close to about 1. The second normal distribution of the second similarity of the second optical signal may also be formed near about 1.

In one or more example embodiments, the first optical signal may be a first optical signal collected during the target substrate treating process to check whether the outdoor air is introduced into the vacuum chamber and/or gas is mixed, in comparison with the second optical signal. The first normal distribution of the first optical signal may be compared with the second normal distribution of the second optical signal, and whether the outdoor air is introduced into the vacuum chamber and/or gas is mixed during the substrate treating process may be checked.

For example, when the first optical signal is a first optical signal in the normal case, in which the outdoor air inflow and/or gas mixing have not occurred in the target substrate treating process, the first optical signal may be similar to the second optical signal of the normal case. In other words, the first similarity may have a value close to about 1 similar to the second similarity, and the first normal distribution of the first similarity may illustrate a distribution similar to the second normal distribution of the second similarity.

On the other hand, when the first optical signal is a first optical signal in an abnormal case, in which the outdoor air inflow and/or gas mixing have occurred in the target substrate treating process, the first optical signal may be different from the second optical signal of the normal case. That is, the first similarity may have a value less than the second similarity. That is, the first similarity may have a value closer to about 0 than the second similarity. In other words, the first normal distribution of the first similarity may be formed at a position closer to about 0 than the second normal distribution of the second similarity.

When the first similarity represented by the first normal distribution is less than the second similarity represented by the second normal distribution, it may be assumed that the outdoor air inflow and/or gas mixing have occurred during the target substrate treating process, in which the first optical signal has been collected.

Figure 8A:
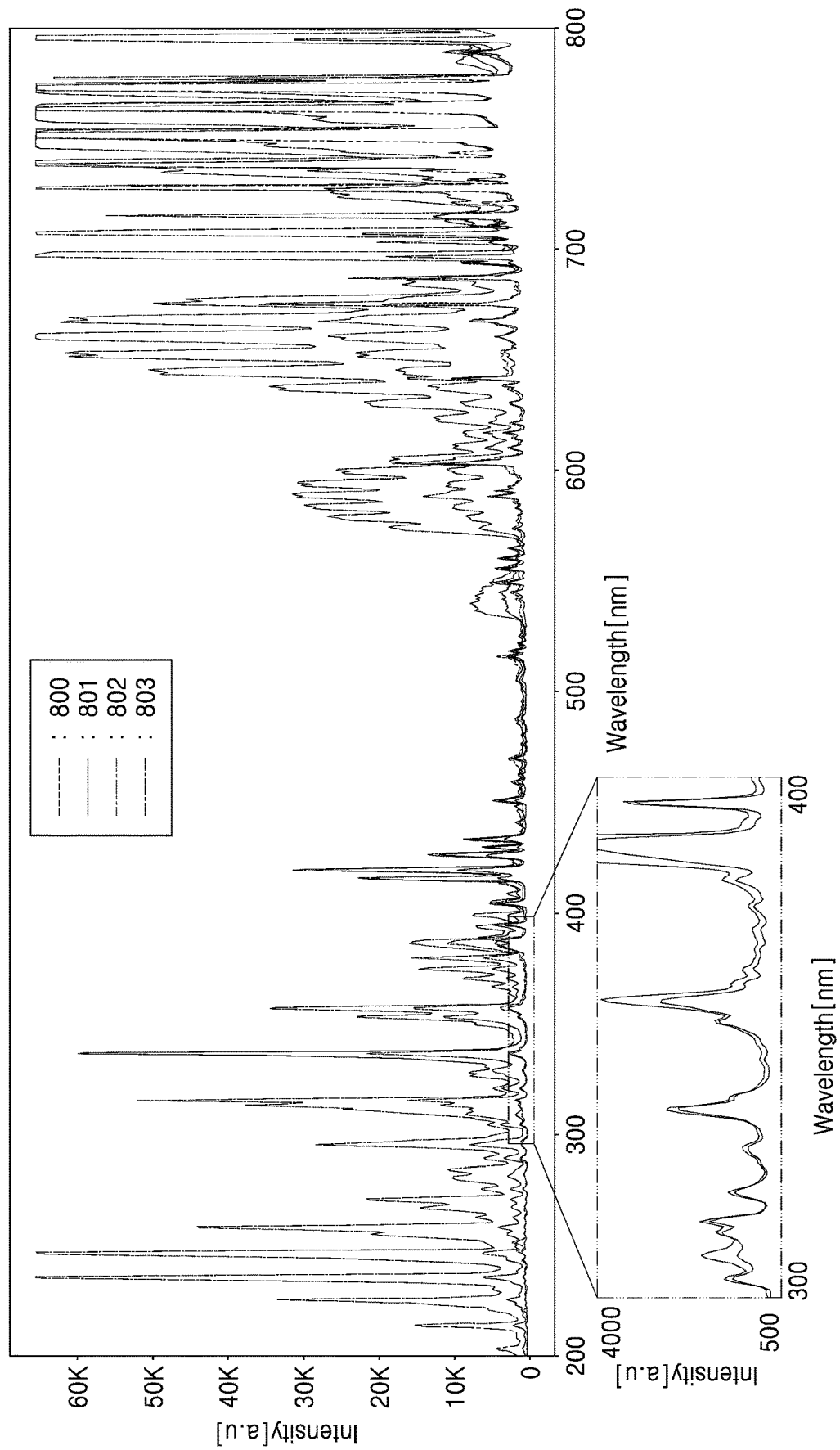
FIG. 8A is a graph of experiment data of an inspection method and a substrate processing method, according to one or more example embodiments.
Figure 8B:
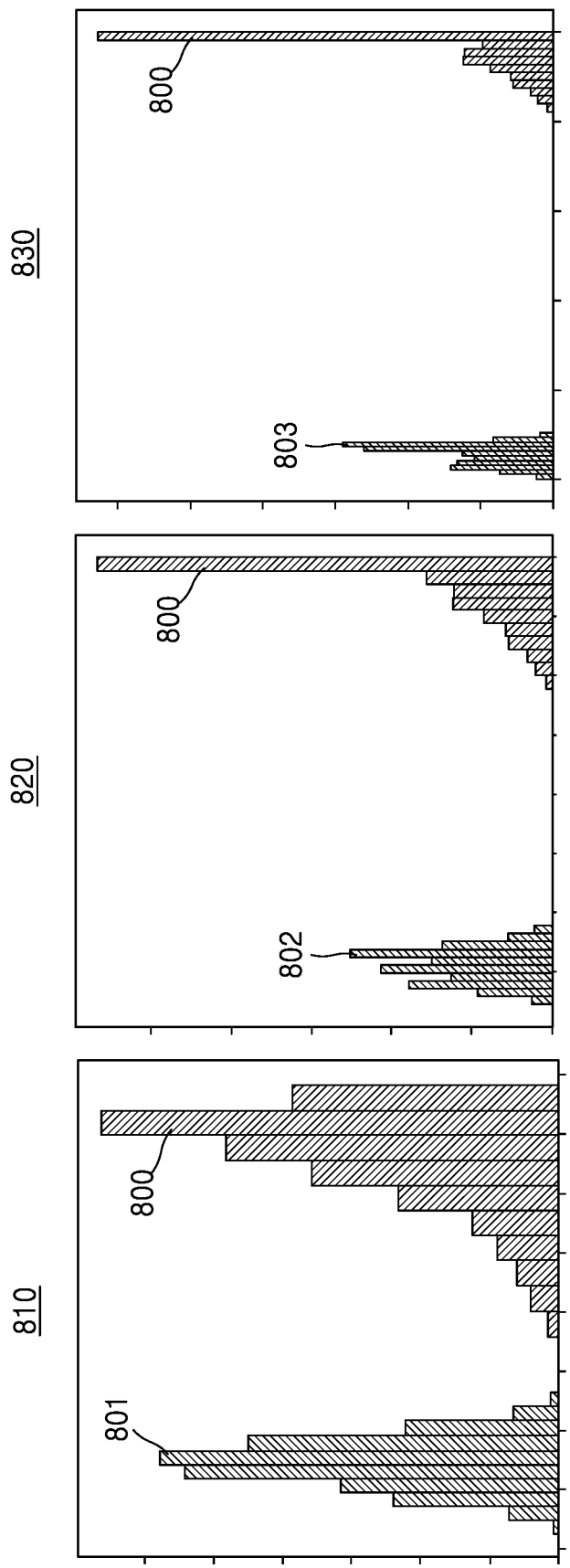
FIG. 8B is a normal distribution graph of the experiment data in FIG. 8A of an inspection method and a substrate processing method, according to one or more example embodiments.

FIG. 8A is a graph of experiment data of an inspection method and a substrate processing method, according to one or more example embodiments. FIG. 8B is a normal distribution graph of the experiment data of FIG. 8A of an inspection method, according to one or more example embodiments.

Referring to one or more example embodiments shown in FIG. 8A, the full spectrum data is illustrated, which corresponds to a control group 800 collected in the normal substrate treating process in the normal case, in which the outdoor air has not been introduced, and an experiment example 1 referenced by 801, an experiment example 2 referenced by 802, and an experiment example 3 referenced by 803, respectively, for the cases of introducing the outdoor air at about 5 standard cubic centimeters per minute (sccm), about 50 sccm, and about 500 sccm.

In the case of the experiment example 3 referenced by 803, in which a large amount of the outdoor air is introduced, because there is a clear difference when the spectrum data collected by using the OES is compared with the spectrum data of the control group 800, it may be easy to determine whether the outdoor air has been introduced. However, in the case of experiment example 1 referenced by 801, in which a small amount of the outdoor air is introduced, it may not be accurately determined by using only the spectrum data.

Referring to one or more example embodiments shown in FIG. 8B, the first, second and third normal distribution graphs 810, 820, and 830 may be obtained. Referring to the first normal distribution graph 810, in which the normal distribution of the experiment example 1 referenced by 801 is compared with the normal distribution of the control group 800, even when the amount of the introduced outdoor air is very small as about 5 sccm or less, it may be possible to clearly determine whether the outdoor air has been introduced. This may be the same as in the case of the experiment example 2 referenced by 802 and the experiment example 3 referenced by 803, in which more amount of the outdoor air is introduced than the case of the experiment example 1 referenced by 801.

In other words, by using the inspection method, the substrate processing method including the inspection method, and the substrate processing device using the inspection method according to one or more example embodiments, it may be possible to detect whether outdoor air is introduced and/or gas is mixed, which has been impossible to detect by using only the comparing method of the spectrum data in the related art.

While one or more example embodiments have been particularly shown and described above, it will be apparent to those skilled in the art that various changes in form and details may be made therein without departing from the spirit and scope of the following claims.

What is claimed is:

1. A substrate processing method comprising:
   causing an analysis device to extract a first similarity by comparing first data of a first optical signal with reference data of a reference optical signal;
   causing the analysis device to generate a first normal distribution of the first similarity;
   causing the analysis device to extract a second similarity by comparing second data of a second optical signal with the reference data;
   causing the analysis device to generate a second normal distribution of the second similarity;
   causing the analysis device to compare the first normal distribution with the second normal distribution,
   wherein the causing the analysis device to extract the first similarity by comparing the first data of the first optical signal with the reference data of the reference optical signal comprises causing the analysis device to derive the first data of the first optical signal, and wherein the causing the analysis device to derive the first data of the first optical signal comprises:

causing the analysis device to receive spectrum data of the first optical signal collected in a chamber by using optical emission spectrometry;

causing the analysis device to select data of a first section and data of a second section, which have a first section size, from the spectrum data;

causing the analysis device to scale each of the data of the first section and the data of the second section to a value greater than or equal to 0 and less than or equal to 1;

causing the analysis device to convert the scaled data by using a fitting function $f(x)=Ae^{-\omega|x^n|}+c$>, where n is a rational number greater than or equal to 1, and less than or equal to 5;

causing the analysis device to determine a peak probability of each of the data of the first section and the data of the second section by using the fitting function;

if the peak probability of each of the data of the first section and the data of the second section is less than a reference point, causing the analysis device to convert the peak probability into 0; and if the peak probability of each of the data of the first section and the data of the second section is equal to or greater than the reference point, causing the analysis device to convert the peak probability into 1, and wherein the analysis device derives the reference data and the second data using a method that is the same as that of the first data;

causing the analysis device to determine whether outside gas inflow occurred in the chamber based on the comparing the first normal distribution with the second normal distribution; and causing the analysis device to control, based on a result of the determining whether the outside gas inflow occurred in the chamber, a plasma source to process a substrate in the chamber using plasma.

2. The substrate processing method of claim 1, wherein the causing the analysis device to derive the first data further comprises causing the analysis device to determine a stable time section of the spectrum data, and wherein the first section and the second section are from the stable time section.

3. The substrate processing method of claim 1, wherein the causing the analysis device to extract the first similarity further comprises:

causing the analysis device to extract the first similarity in a first time; and causing the analysis device to extract the first similarity in a second time, wherein the causing the analysis device to extract the first similarity in the first time comprises causing the analysis device to compare the first data in the first time with the reference data in a third time, wherein the causing the analysis device to extract the first similarity in the second time further comprises causing the analysis device to compare the first data in the second time with the reference data in a fourth time, and wherein the causing the analysis device to generate the first normal distribution of the first similarity further comprises causing the analysis device to generate distributions of the first similarity in the first time and the first similarity in the second time.

4. The substrate processing method of claim 3, wherein the causing the analysis device to derive the first data further comprises causing the analysis device to determine a stable time section of the spectrum data, and wherein the first time and the second time are from the stable time section.

5. The substrate processing method of claim 1, wherein the spectrum data is in a visible light wavelength region.

6. The substrate processing method of claim 1, wherein the first optical signal is a first comparison group, wherein the second optical signal is a second comparison group, wherein the reference optical signal is a control group, and wherein the substrate processing method further comprises causing the analysis device to compare optical signals of the first comparison group and the second comparison group to the control group.

7. The substrate processing method of claim 1, wherein the analysis device derives the reference data and the second data by selecting data of a plurality of sections having the first section size.

8. The substrate processing method of claim 1, wherein the causing the analysis device to determine the peak probability further comprises causing the analysis device to represent the peak probability as a value greater than or equal to 0 and less than or equal to 1.

9. The substrate processing method of claim 1, wherein the causing the analysis device to extract the first similarity further comprises causing the analysis device to compare data of the first data with data of the reference data in identical wavelength sections.

10. A substrate processing method comprising:

causing an analysis device to perform an inspection method for identifying a condition in a chamber;

wherein the inspection method comprises:

causing the analysis device to receive spectrum data of a first optical signal collected in the chamber by using optical emission spectrometry;

causing the analysis device to select data of a first section and data of a second section, which have a first section size, from the spectrum data;

causing the analysis device to scale each of the data of the first section and the data of the second section to a value greater than or equal to 0 and less than or equal to 1;

causing the analysis device to convert the scaled data by using a fitting function $f(x)=Ae^{-\omega|x^n|}+c$, where n is a rational number greater than or equal to 1, and less than or equal to 5;

causing the analysis device to determine a peak probability of each of the data of the first section and the data of the second section by using the fitting function;

if the peak probability of each of the data of the first section and the data of the second section is less than a reference point, causing the analysis device to convert the peak probability into 0;

if the peak probability of each of the data of the first section and the data of the second section is equal to or greater than the reference point, causing the analysis device to covert the peak probability into 1;

causing the analysis device to derive first data of the first optical signal; and causing the analysis device to extract a first similarity by comparing the first data with reference data of a reference optical signal
wherein the analysis device derives the reference data and the first data using a same method;
causing the analysis device to identify whether the condition in the chamber is a normal state by causing the analysis device to determine whether outside gas inflow occurred in the chamber based on the extracted first similarity; and
causing the analysis device to control, based on the condition in the chamber being identified as the normal state, a plasma source to perform a plasma processing operation comprising controlling processing a substrate in the chamber using plasma.

11. The substrate processing method of claim 10, further comprising:
causing the analysis device to extract a second similarity by comparing second data of a second optical signal with the reference data; and
causing the analysis device to compare the first similarity with the second similarity,
wherein the causing the analysis device to extract the second similarity is performed using the same method as that used for extracting the first similarity.

12. The substrate processing method of claim 11, further comprising:
causing the analysis device to generate a first normal distribution of the first similarity;
causing the analysis device to generate a second normal distribution of the second similarity; and
causing the analysis device to compare the first normal distribution with the second normal distribution.

13. The substrate processing method of claim 10, wherein the causing the analysis device to derive the first data further comprises determining a stable time section of the spectrum data, and
wherein the first section and the second section are from the stable time section.

14. The substrate processing method of claim 10, wherein the causing the analysis device to extract the first similarity further comprises:
causing the analysis device to extract the first similarity from a first time; and
causing the analysis device to extract the first similarity from a second time,
wherein the causing the analysis device to extract the first similarity from the first time comprises causing the analysis device to compare the first data from the first time with the reference data from a third time, and
wherein the causing the analysis device to extract the first similarity from the second time further comprises causing the analysis device to compare the first data from the second time with the reference data from a fourth time.

15. The substrate processing method of claim 12, wherein the causing the analysis device to extract the first similarity further comprises:
causing the analysis device to extract the first similarity from a first time; and
causing the analysis device to extract the first similarity from a second time,
wherein the causing the analysis device to extract the first similarity from the first time comprises causing the analysis device to compare the first data from the first time with the reference data from a third time,
wherein the causing the analysis device to extract the first similarity from the second time further comprises causing the analysis device to compare the first data from the second time with the reference data from a fourth time, and
wherein the causing the analysis device to generate the first normal distribution comprises generating distributions of the first similarity from the first time and the second time.

16. The substrate processing method of claim 14, wherein the causing the analysis device to derive the first data further comprises determining a stable time section of the spectrum data, and
wherein the first time and the second time are from the stable time section.

17. A substrate processing device comprising:
a chamber;
a plasma source configured to generate plasma for processing a substrate in the chamber;
an optical emission spectrometer (OES) configured to measure spectrum data of a first optical signal in the chamber; and
an analysis device configured to analyze the spectrum data measured by using the OES,
wherein the analysis device is further configured to:
collect the spectrum data by using the OES;
select data of a first section and data of a second section, which have a first section size, from the spectrum data;
scale each of the data of the first section and the data of the second section to a value greater than or equal to 0 and less than or equal to 1;
convert the scaled data by using a fitting function $f(x)=Ae^{-\omega|x^n|}+c$, where n is a rational number greater than or equal to 1, and less than or equal to 5;
determine a peak probability of each of the data of the first section and the data of the second section by using the fitting function;
based on the peak probability being less than a reference point, convert the peak probability into 0;
based on the peak probability being equal to or greater than the reference point, convert the peak probability into 1;
derive first data of the first optical signal; and
extract a first similarity by comparing the first data with reference data of a reference optical signal,
wherein the reference data and the first data are derived using a same method,
wherein the analysis device is further configured to determine whether outside gas inflow occurred in the chamber based on the extracted first similarity, and
wherein the substrate processing device is further configured to control, based on a result of the determination whether the outside gas inflow occurred in the chamber, the plasma source to generate the plasma for processing the substrate in the chamber.

18. The substrate processing device of claim 17, wherein the analysis device is further configured to:
extract a second similarity by comparing second data of a second optical signal with the reference data; and
compare the first similarity with the second similarity, and
wherein the second similarity and the first similarity are extracted using a same method.

19. The substrate processing device of claim 18, wherein the analysis device is further configured to:
generate a first normal distribution of the first similarity;

generate a second normal distribution of the first similarity; and compare the first normal distribution with the second normal distribution.

20. The substrate processing device of claim 19, wherein the analysis device is further configured to extract the first similarity by comparing the first data with the reference data by:

extracting the first similarity from a first time; and
extracting the first similarity from a second time,
wherein the extracting the first similarity from the first time comprises comparing the first data from the first time with the reference data from a third time,
wherein the extracting the first similarity from the second time comprises comparing the first data from the second time with the reference data from a fourth time, and
wherein the analysis device is further configured to generate the first normal distribution by generating distributions of the first similarity from the first time and the first similarity from the second time.

* * * * *